Oct. 21, 1969     R. A. CAMPBELL     3,473,713
AUTOMOBILE REAR DECK BAG
Filed Oct. 20, 1967     2 Sheets-Sheet 1
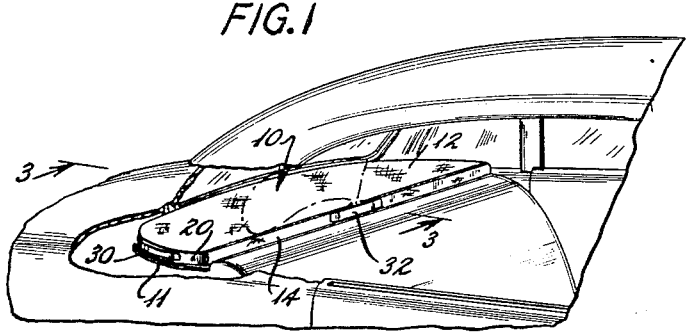
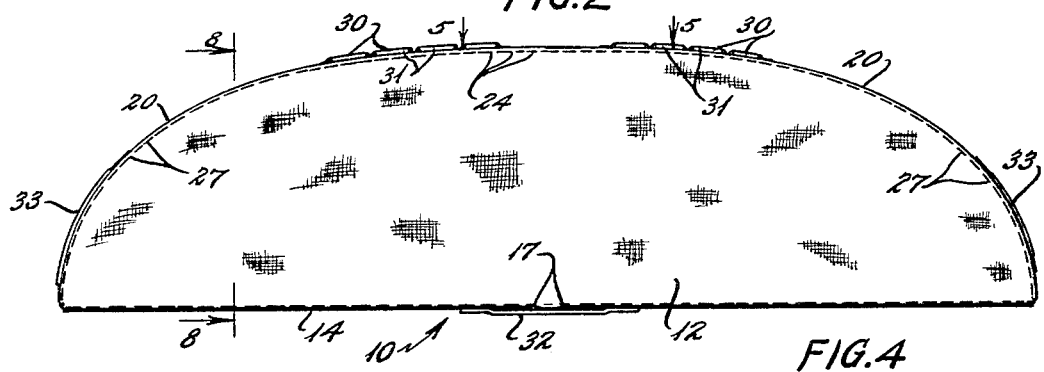
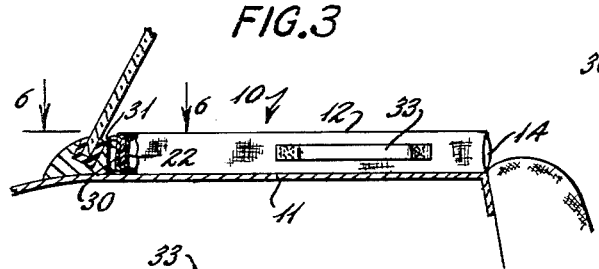
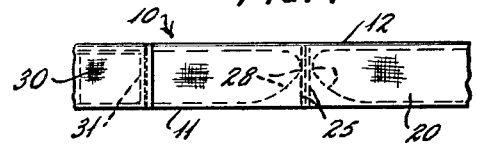
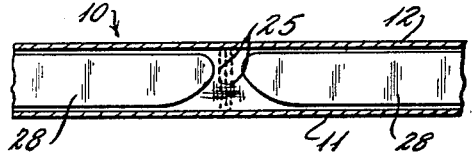
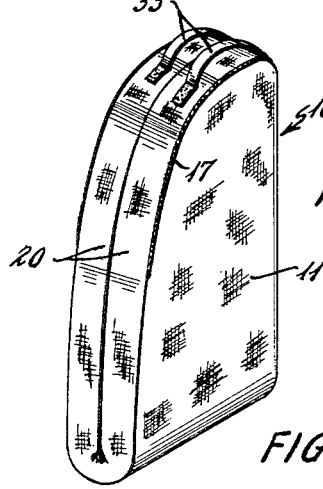
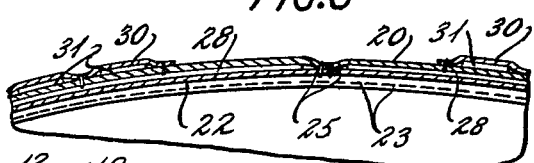
INVENTOR
RUTH A. CAMPBELL
BY
ATTORNEYS Oct. 21, 1969     R. A. CAMPBELL     3,473,713
AUTOMOBILE REAR DECK BAG
Filed Oct. 20, 1967     2 Sheets-Sheet 2
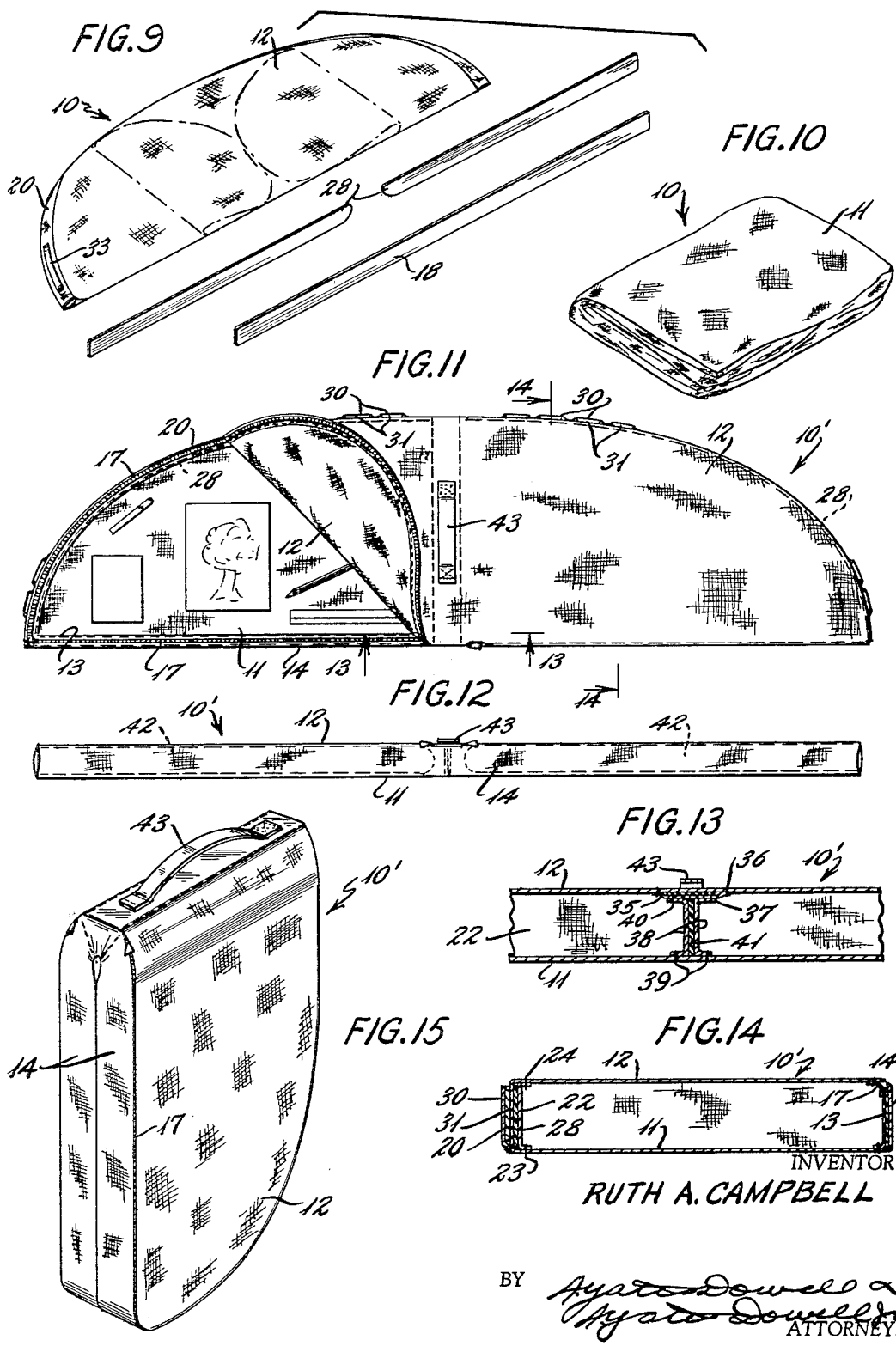

United States Patent Office 3,473,713
Patented Oct. 21, 1969

3,473,713
AUTOMOBILE REAR DECK BAG
Ruth A. Campbell, Alexandria, Va.
(Box 9372 Rosslyn Station, Arlington, Va. 22209)
Filed Oct. 20, 1967, Ser. No. 676,914
Int. Cl. B60r 7/00
U.S. Cl. 224—42.01                                    4 Claims

ABSTRACT OF THE DISCLOSURE

A relatively long flat deck bag generally corresponding in contour to the rear deck beneath the window of an automobile and with low profile in order not interfere with the view through the window and with suitable means for maintaining the bag in extended article-carrying condition, as well as for retaining it on the deck, but capable of being laundered, compactly folded, and stored in a small space, such as a glove compartment.

BACKGROUND OF THE INVENTION

Field of the invention

This invention relates generally to article carriers and particularly to containers for carrying and storing various objects in an automobile.

Description of the prior art

Various types of carriers or containers of many shapes and sizes and for objects of many kinds have been provided, including for use in automobiles. However, these have not supplied all the needs, for the reason that they were of limited use, obstructed the view of the driver, were bulky, expensive, lacked durability, and did not provide for the desired efficient handling of objects.

SUMMARY OF THE INVENTION

A deck bag of durable fabric or other sheet material of generally half-moon shape or other configuration in order to conform to the rear deck under the window of an automobile, but of low profile in order not to interfere with the view through the rear window. It has a relatively long opening in its straight front extending along part of its rear edge including the curved end portion thereof with a zipper or other closure means for such opening. Along its front and rear is a tube or casing for receiving removable stiffening or supporting stays to give shape and dimension to the bag. The bag may have handles at opposite ends, at the center, at spaced locations along the rear edge, and centrally of the front edge to facilitate handling. Also small magnets may be incorporated in the rear portion magnetically to secure the bag in position under the window and retard or prevent sliding. The bag thus provided affords convenient storage space for relatively small or generally flat objects without obstructing the view through the rear window. Due to the fact that the stays or supports are removable, the bag may be laundered, folded, and stored in a small space such as the glove compartment.

It is an object of the invention to provide a relatively simple, inexpensive article container or carrier for miscellaneous objects, which article container or carrier is of light weight, durable, sheet material, easy to handle, transport, open and close, launder, and possessed of other desirable characteristics including having the general shape of the rear deck of an automobile on which it is adapted to be disposed to provide maximum carrying capacity, as well as having a relatively low profile in order not to interfere with the vision through the rear window.

BRIEF DESCRIPTION OF THE DRAWINGS

FIG. 1 is a perspective illustrating one application of the invention;
FIG. 2, an enlarged top plan view thereof;
FIG. 3, an enlarged section on the line 3—3 of FIG. 1;
FIG. 4, an enlarged fragmentary rear elevation;
FIG. 5, an enlarged section on the line 5—5 of FIG. 2;
FIG. 6, a section on the line 6—6 of FIG. 3;
FIG. 7, a perspective of the bag folded;
FIG. 8 an enlarged detail section on the line 8—8 of FIG. 2;
FIG. 9, an exploded perspective of the bag and the reinforced stays thereof;
FIG. 10, a view of the bag devoid of stays and folded for minimum space occupancy;
FIG. 11, a top plan view of a modified form illustrated partially open;
FIG. 12, a front elevation thereof;
FIG. 13, an enlarged section on the line 13—13 of FIG. 11;
FIG. 14, an enlarged section on the line 14—14 of FIG. 11; and
FIG. 15, a perspective of the container folded for carrying in an inverted position from that of FIG. 7.

DESCRIPTION OF THE PREFERRED EMBODIMENT

With continued reference to the drawings a bag or container 10 is provided having a bottom 11 and a top 12 each of which has a generally straight front edge and a curved or arcuate rear edge. At the front of the bag, a relatively low profile inner panel 13 is provided which may be an upstanding portion of the bottom 11, as illustrated, or may be a separate panel which is sewn or otherwise attached to such bottom. An outer front panel 14 is connected to the panel 13 adjacent to the bottom 11 by stitching 15 (FIG. 8) and is connected to the top of the panel 13 by stitching 16. Preferably portions of a pair of closure fasteners such as zippers 17 are attached to the upper portion of the panels 13 and 14 and located either between the upper edges of such panels or interiorly of the panel 13, such fasteners being attached by the stitching 16. Each of the closure fasteners 17 has one end located generally centrally of the upper edges of the panels 13 and 14 and extends outwardly along such edges.

The panels 13 and 14 define a pocket for the reception of a stiffening member or stay 18 constructed of a relatively rigid material such as plastic, sheet metal, cardboard or the like, which is sufficiently flexible to be bent in one direction but is relatively stiff in another direction. The pocket between the panels 13 and 14 preferably is open at both ends so that the stiffening member 18 may be withdrawn when the bag is not in use. The other portions of the closure fasteners or zippers 17 are connected to the top 12 by stitching 19.

An outer rear panel 20 of substantially the same height as the panel 13 is connected to the arcuate edge of the bottom 11 in any desired manner, as by stitching 21 (FIG. 8), and an inner rear panel 22 is connected to the outer rear panel 20 and the bottom 11 in any desired manner as by stitching 23. At the central portion of the bag 10 the outer and inner rear panels are sewn to the top 12 by stitching 24 which extends outwardly approximately half the length of the curved rear edge. Also the panels 20 and 21 are sewn to each other by stitching 25 in a vertical direction substantially along the center line, as illustrated in FIGS. 4–6.

In order to open the bag to expose the contents, the closure fasteners 17 may extend around the front corners of the bag and along the curved rear edge substantially to the stitching 24 so that the top 12 may be opened, as illustrated in phantom in FIG. 1 and as illustrated in full lines in FIG. 11. In the portion of the bag in which the closure fasteners extend around the curved edges, the outer and inner rear panels are sewn together and to a potion of the closure fasteners by stitching 26 and the other portion of the closure fasteners are sewn to the top 12 by stitching 27.

With the above construction the outer and inner rear panels define a pair of pockets for the reception of a pair of stiffening members or stays 28 which maintain the top and bottom separated. The pockets defined by the rear panels preferably are open adjacent to the front of the bag to allow the stiffening members to be inserted for use and removed when not in use. The outer rear panel 20 may have one or more flaps or pockets 30 sewn on the exterior thereof in which magnets 31 are received. Such magnets are attracted to the metal of the body of the automobile or the metal of the window frame to hold the bag in position.

The bag is intended to contain miscellaneous articles, particularly children's articles such as books, crayons, pencils, games and the like with which the children can amuse themselves on long motor trips.

In order to remove the bag from the rear deck of the automobile a handle 32 is sewn or otherwise attached to the front panel 14 so that the bag can be carried in the manner of a suitcase or the like. A more compact carrying case can be provided by attaching a handle 33 at each end of the bag so that when the stiffening member 18 is removed the ends of the bag can be doubled as illustrated in FIG. 7 and a person can grasp the handles 33 to carry the bag.

When the bag is not in use the stiffening members 18 and 28 can be removed to collapse the bag and thereafter the opposite ends may be folded in, as illustrated in phantom in FIG. 9, and again folded into a compact unit, as illustrated in FIG. 10, which will occupy a minimum of space and can be stored on the rear deck, within the glove compartment, or in any other convenient space.

With reference to FIGS. 11–15 a modified form of the invention is provided including a bag 10' which is substantially identical with the previous embodiment with the exception that a panel 35 is connected from the front to rear of the top 12 by stitching 36 to form a pocket for the reception of an additional stiffening member or stay 37. A pair of generally parallel panels 38 are connected by switching 39 from front to rear of the bottom 11 and by stitching 40 from front to rear of the panel 35. The panels 38 define a pocket for a stiffening member or stay 41 which extends transversely of the bag and will divide the bag into two separate compartments as well as support the intermediate portion of the bag. In this modification the pocket created by panels 13 and 14 at the front of the bag will accommodate a pair of stiffening members 42 which normally are separated at the central portion of the bag. A handle 43 is sewn or otherwise attached to the top 12 in the area of the stiffening member 37 so that when the handle 43 is grasped the bag can be lifted and the opposite ends will automatically fold downwardly into generally parallel relation with each other as illustrated in FIG. 15.

In the operation of the device the bag which is in folded condition when not in use is unfolded after which the stiffening members are inserted in their respective pockets and the bag placed on the rear deck of an automobile in position that the magnets 31 will be attracted to the metal of the body of the automobile to hold the bag in position. The closure fasteners 17 then can be operated to open the top 12 and expose the compartments so that various objects can be placed therein.

It is contemplated that instead of having pockets formed by generally parallel panels, a single thickness of material could be provided with loops, snaps or other attaching means for the reception of the stiffening members.

It will be apparent from the foregoing that a deck bag or article container and carrier or tote bag is provided which is simple to manufacture and to use, as well as to carry, and which can be applied to the deck under the rear window of an automobile and provide a relatively low profile for the storage of various articles used by both children and adults, and that such bag may be quickly installed, removed, access had thereto, folded, transported, and the like.

What is claimed is:

1. An article container and carrier adapted to be removably mounted on the rear deck behind the rear seat and forwardly of the rear window of an automobile, and comprising a bottom and a top of sheet material having a relatively straight front edge and a curved rear edge to conform to the curvature of the deck of the automobile, a front panel permanently connected to said bottom along said relatively straight edge, a rear panel permanently connected to said bottom along the curved rear edge thereof, a portion of said rear panel being permanently connected to said top along its curved rear edge, selectively openable closure means connecting said front panel and said top and connecting a portion of said rear panel and said top, said container having a low profile allowing unobstructed vision through the rear window of the automobile to which it is applied, said container being foldable to provide equal side portions when folded together to obtain a compact package, and magnetic means carried by said container for holding the latter in place when applied to the rear deck of an automobile.

2. An article container and carrier adapted to be removably mounted on the rear deck behind the rear seat and forwardly of the rear window of an automobile and comprising a bottom and a top of sheet material having a relatively straight front edge and a curved rear edge to conform to the curvature of the deck of the automobile, a front panel permanently connected to said bottom along said relatively straight edge, a rear panel permanently connected to said bottom along the curved rear edge thereof, a portion of said rear panel being permanently connected to said top along its curved rear edge, selectively openable closure means connecting said front panel and said top and connecting a portion of said rear panel and said top, said container having a low profile allowing unobstructed vision through the rear window of the automobile to which it is applied, said container being foldable to provide equal side portions when folded together to obtain a compact package, and means carried by said container for holding the latter in place when applied to the rear deck of an automobile.

3. The structure of claim 1 including stiffening members carried by said front and rear panels.

4. The structure of claim 1 in which said bottom, top and marginal member are constructed of flexible collapsible material, and at least one stiffening member is removably mounted in said container and carrier.

References Cited

UNITED STATES PATENTS

| 2,086,895 | 7/1937 | Cart | 190—41 X |
| 2,808,290 | 10/1957 | Nelson | 224—42.42 X |
| 2,825,447 | 3/1958 | Kurland | 206—19.5 |
| 3,019,869 | 2/1962 | Engelhardt | 190—43 |
| 3,104,740 | 9/1963 | Koffler | 190—41 X |
| 3,147,866 | 9/1964 | Jones et al. | 206—19.5 X |
| 3,393,845 | 7/1968 | Gilbreath | 224—29 |

GERALD M. FORLENZA, Primary Examiner

U.S. Cl. X.R.

190—43; 224—42.42